United States Patent [19]

Hashimoto

[11] Patent Number: 5,569,377
[45] Date of Patent: Oct. 29, 1996

[54] SPRAY PAINTING EQUIPMENT

[75] Inventor: Milton Hashimoto, Honolulu, Hi.

[73] Assignees: Milton Hasimoto, Honolulu; Susumu Emoto; Masuichi Matsuura, both of Kahului; Michael J. Tamanaha, Wailuku; Christopher P. McKenzie, Honolulu, all of Hi.

[21] Appl. No.: 335,062

[22] Filed: Oct. 21, 1994

[51] Int. Cl.⁶ .................................................. B01D 29/085
[52] U.S. Cl. ......................... 210/238; 210/249; 210/250; 210/257.1; 210/335; 210/471; 210/474; 210/930; 248/94; 248/694; 248/121
[58] Field of Search ..................................... 210/249, 250, 210/238, 153, 241, 248, 257.1, 335, 474, 471, 495, 497.01, 930; 248/94, 674, 121

[56] References Cited

U.S. PATENT DOCUMENTS 545,915  9/1895  Russell .
1,868,269  7/1932  Beadle .
2,023,007  12/1935  Delano .
2,174,093  9/1939  Perlman .
2,883,057  4/1959  Richards .
4,025,435  5/1977  Shea .

*Primary Examiner*—Thomas M. Lithgow
*Attorney, Agent, or Firm*—Robert W. Fiddler

[57] ABSTRACT

Spray paint equipment combining a paint gun and stand. The stand serves to adjustably support a primary paint supply; filters for filtering paint; a gravity feed tank for the spray gun and the spray gun when it is not in use. To this end the stand is formed with a horizontal base dimensioned to support the paint supply. An upstanding vertical post extending from the base has adjustably mounted thereon an initial filter holder supporting a filter to filter paint as it is delivered into the paint supply. Also adjustably arranged on the vertical support post is another filter supporting holder and final filter mounted above an adjustable gravity tank support and gravity feed paint tank for the spray gun permitting selective positioning of the componets necessary to effect spray painting.

10 Claims, 2 Drawing Sheets

SPRAY PAINTING EQUIPMENT

This invention relates to the art of spray painting equipment, and more particularly to an improved combination of a paint spray gun and supporting stand serving to facilitate the provision of filtered paint to the paint spray gun.

BACKGROUND OF THE INVENTION

Paint spray guns have long been used to effect uniform distribution of paint. Such paint spray guns are widely used in the automotive repair field, and other metal spraying situations.

In order to facilitate atomizing of the paint to provide a desired spray of paint on the surface to be painted, spray guns are formed with paint distribution nozzles, having relatively small discharge orifices. With the relatively small orifice spray nozzles employed, it is necessary to remove from the paint any particulate matter larger than the nozzle orifice so as to prevent nozzle clogging. To this end, the paint supplied to the gun is passed through filters to remove any undesired particles.

Further, gravity feed paint supply tanks are employed to fill the gun, requiring that the gun be held in position to be filled as the paint drains from the tank into the gun.

A typical paint sprayer employs a primary paint supply in the form of a manually manipulable can or the like container. This primary paint supply is filled with paint, which is passed through a filter as it is poured into the paint supply. The filtered paint supply container is then used to provide paint to a gravity feed paint tank which must then be supported while paint drains into the paint spray gun. The paint supplied to the gravity feed tank from the paint supply is also preferably passed through a filter.

In a typical auto body repair shop, the support of the primary paint supply with respect to a filter, and the subsequent filtering of the paint transferred from the paint supply to the gravity feed tank of the spray gun with subsequent draining of the paint from the gravity feed tank into the gun involves rather clumsy and time consuming manipulation of filters, paint supply cans and the gravity feed tank, with resultant inefficiencies of paint handling, and spillage of paint.

BRIEF SUMMARY OF THE INVENTION

It is with the above considerations in mind that the present improved paint spraying arrangement has been evolved, combining a paint spray gun with a stand for supporting desired paint containers, tanks and filters along with the spray gun.

It is accordingly a primary object of the invention to provide an improved arrangement of spray gun and paint supply on a stand along with desired filter supports to facilitate filtering of the paint delivered from the paint supplies to the gun.

Another object of this invention is to provide an improved paint spray gun stand serving to support the necessary paint supplies in proximity to the gun to facilitate transfer of the paint to the gun.

It is also an object of the invention to provide a combination of spray gun and paint supply supporting stand subject to selective adjustment to accommodate different paint supplies and filters particularly adapted for use in an automotive body and fender repair shop.

These and other objects of the invention which will become hereafter apparent are achieved by providing a base member dimensioned to underlie and support a paint container. Upstanding and secured to the base is a vertical support post dimensioned to extend above the height of the paint container, preferably a distance at least twice the height of the paint container. Adjustably secured on the post are one or more filter holders, two being preferred. An initial filter holder in the form of a ring is adjustably secured to the post above the paint container, and an initial filter is supported on said holder. A final filter holder, preferably in the form of a ring, is also adjustably supported on the post, preferably above and unaligned with the initial filter holder, and a final filter is supported on said final filter holder. Beneath the final filter there is arranged on the post an adjustable tank support and a gravity feed paint tank couplable to a paint spray gun on the support.

A feature of the invention resides in the arrangement of the stand so that it supports desired filters in position with respect to an initial paint supply and the spray gun paint feeding tank so that desired filtration of the paint in the initial paint supply as well as in the spray gun feed tank may be accomplished with minimal manipulation.

Another feature of the invention resides in the fact that the combined support and gun is subject to ready adjustment to accommodate differently sized paint containers and filter arrangements.

BRIEF DESCRIPTION OF THE DRAWINGS

The specific details of a preferred embodiment of the invention will be described in clear, concise and exact terms so as to enable any persons skilled in the art to practice the invention, setting forth the best mode contemplated by applicant in conjunction with the accompanying drawings wherein.

DESCRIPTION OF PREFERRED EMBODIMENT

Referring now more particularly to the drawings, like numerals in the various figures will be employed to designate like parts.

Figure 1:
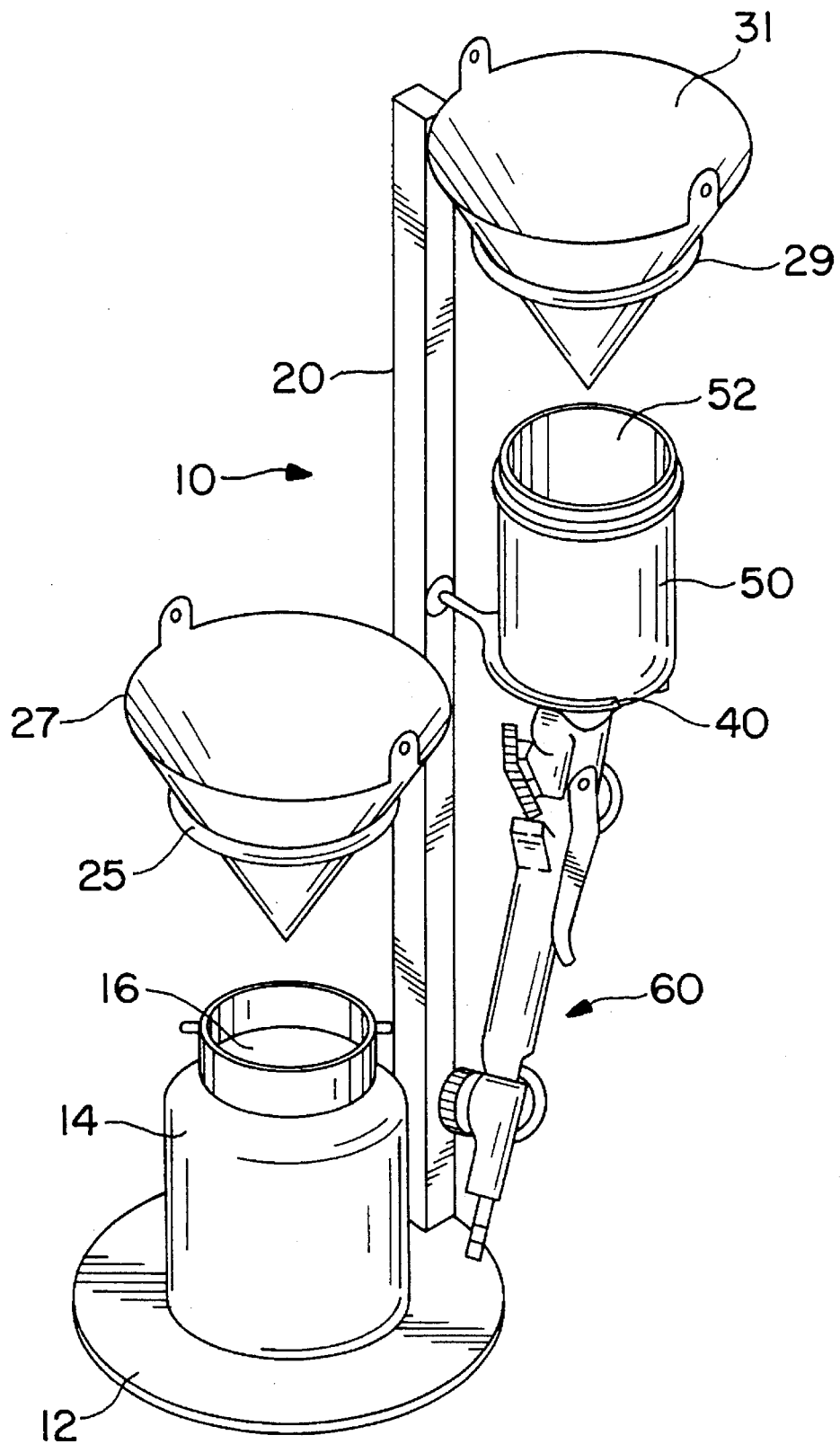
FIG. 1 is perspective view of the combined paint spray gun and stand showing a suggested arrangement of paint containers, filters and gun.

As best seen in FIG. 1, the spray painting equipment 10 is illustratively shown as formed with a base 12 formed preferably of a circular planar configuration dimensioned to underlie and support a cylindrical paint container constituting the primary paint supply 14. The base 12 is formed of a radius greater than that of the container forming the paint supply 12 to leave free space beyond the bounds of the container. The container forming the primary paint supply is formed with an open upper end 16, which is preferably formed with a necked collar 17 surrounding opening 16.

Secured to the base 12 and upstanding therefrom in the space beyond the bounds of paint supply container 12 is a vertical support post 20. Post 20 in the illustrated preferred embodiment is shown as formed of an elongate, rectangular in cross-section bar formed of a material subject to ready and firm securement to the base. Where the base 12 and post 20 are formed of metal such as steel or the like, the post 20 and base 12 may readily be joined by welding. Alternatively, the base 12 and post 20 may be formed of Wood and/or plastic and secured by conventional wood and/or plastic adhesives. As shown in the drawings, post 20 is at least twice the height of primary paint container 14, a post height Of between three and four times the container height being preferred.

An initial filter holder 25 is secured to post 20 at a point above the open upper end 16 of initial paint supply container 14 and an initial filter 27 is mounted on said holder 25. As illustrated, filter holder 25 in the preferred embodiment is of a ring configuration with the filter 27 of a conical shape.

Secured to the post 20, preferably at a point above the initial filter holder 25, is a final filter holder 29, which as shown is arranged so that it is out of line with the initial filter holder 25. In the preferred embodiment employing a rectangular in cross-section post, the holders 25 and 29 are shown as arranged on post sides at 90° to each other. This serves to permit a user to readily approach the equipment with ready access to both filters. A final filter 31, preferably of a cone shape, is supported by filter holder 29, which is ring shaped as holder 25.

Figure 2:
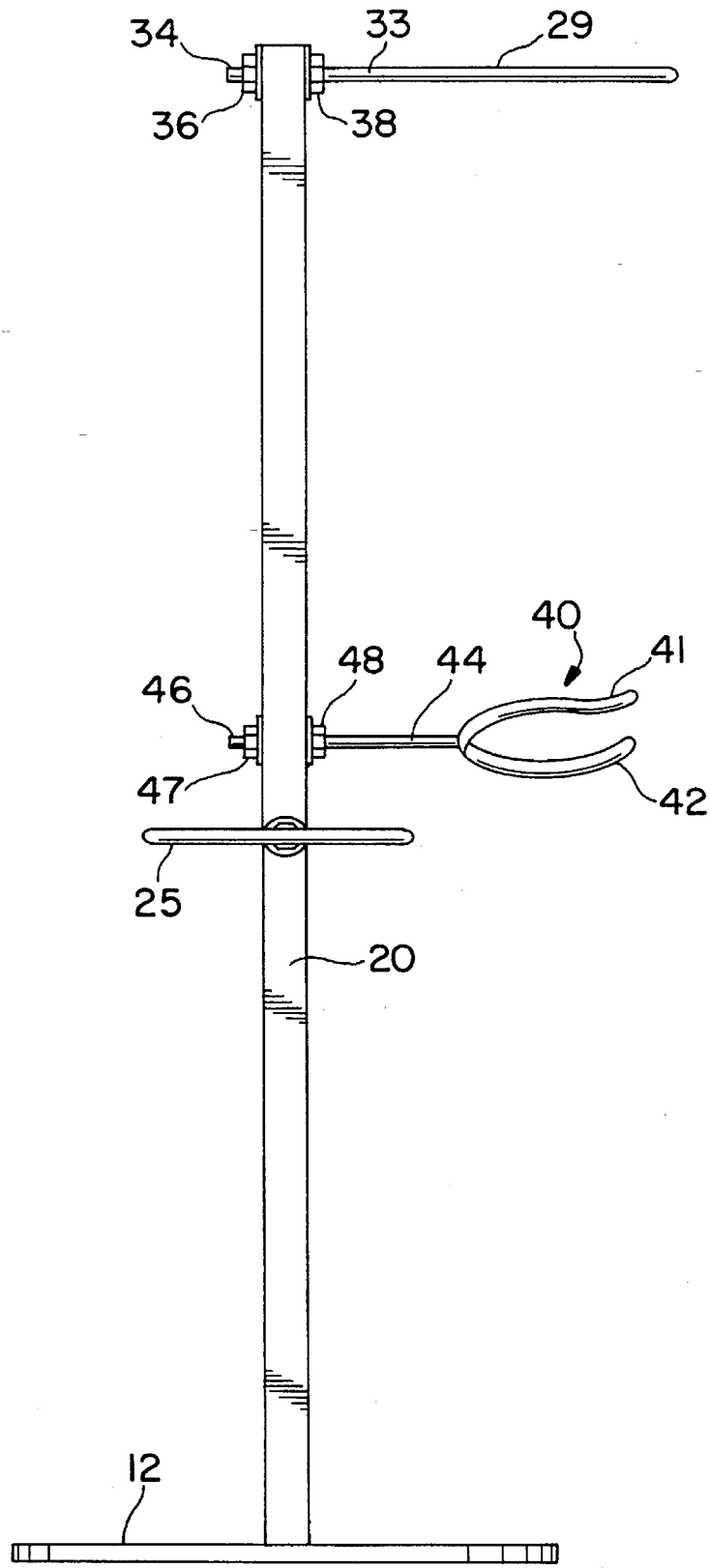
FIG. 2 is an elevational view of the stand showing the paint container and container supporting components as arranged on a main post.

Securement of holders 25 and 29 to post 20 is best achieved as shown in FIG. 2 by forming the holder with a stem 33 having a threaded portion 34 which is extended through post 20. Nuts 36 and 38 arranged on threaded portion 34 on opposite sides of post 20 serve to lock the holders in position.

Adjustably secured to post 20 beneath final filter holder 29 and aligned therewith is a tank support, shown as formed of two spaced tines 41 and 42, as best seen in FIG. 2, extending arcuately from stem 44 formed with threaded end 46. Threaded end 46 is employed like the threaded end 34 of holder 29 to secure the holder 40 to post 20 by extending the threaded end 46 of stem 44 through post 20 with nuts 47 and 48 arranged to engage the threads on the stem 44 on opposed sides of the post 20 to lock the holder 40 in a selected position. As will be apparent to those skilled in the art, loosening either nuts 47 or 48 will permit rotation of stem 44 to change the angle of the plane of tines 41 and 42 with respect to base 12.

The angle of the plane of times 47 and 48 is set to accommodate and engage gravity feed paint tank 50, which as shown, is formed with an open upper end 52 and a necked down lower end 54 dimensioned to seat on the tines 47 and 48 of holder 40.

Paint spray gun 60 is coupled to the lower end of gravity feed tank 50 to permit flow into the gun.

OPERATION

The above described components are fabricated employing conventional production techniques. The base 12 and post 20 as noted are preferably formed of steel, but may readily be formed of wood or plastic. The paint containers 14 and 50 are conventional off-the-shelf paint containers, preferably formed of sheet steel or plastic. The holders are preferably of steel, but may also be of plastic as apparent and the filters are those customarily available for paint filtering, being either felted fabric, paper or metal mesh.

In use after assembly, the user will initially fill the primary paint supply container 14 by passing the paint to be used through initial filter 27 from which it flows into container 14.

When it is desired to fill paint spray gun 60, the gun is coupled to gravity feed tank 50, which is supported on tank support 40, which has previously been adjusted to engage and support tank 50 with the tank top horizontal. A final filter 31 is positioned in filter holder 29, and paint is poured from paint supply container 14 through filter 31 into the open upper end 52 of gravity feed tank 50 for flow into gun 60.

The equipment is such that the user has complete control over paint flow, and can easily transfer filtered paint from a primary paint supply container to a paint spray gun.

The above disclosure has been give by way of illustration and elucidation and not by way of limitation, and it is desired to protect all embodiments of the herein disclosed inventive concept within the scope of the appended claims.

What is claimed is:

1. Spray painting equipment comprising a paint spray gun in combination with a supporting stand, said supporting stand comprising:

a horizontal base member dimensioned to underlie and support a primary paint supply container;

a primary pains supply container on said base, said container having an open upper end;

a vertically extending support post secured to and upstanding from said base member at a point on said base member such that a clear space is left on said base member to support said primary paint supply container;

an initial filter holder selectively positioned on said support post at a point above the open upper end of said primary paint supply container;

an initial filter mounted for support by said initial filter holder;

a final filter holder secured to said support post;

a final filter mounted for support on said final filter holder;

a tank support adjustably secured to said post beneath said final filter;

a gravity feed paint tank positioned on said tank support; and a coupling between the paint spray gun and said gravity feed tank to permit flow of paint from said tank to said gun.

2. Spray painting equipment as in claim 1 in which at least one of said filter holders is in the form of a ring.

3. Spray painting equipment as in claim 1 in which at least one of said filters is of a conical configuration.

4. Spray painting equipment as in claim 1 in which said base is of a circular planar configuration.

5. Spray painting equipment as in claim 1 in which said support post is an elongate bar of rectangular cross-section.

6. Spray painting equipment as in claim 1 in which said support post is at least twice the height of said primary paint supply container.

7. Spray painting equipment as in claim 1 in which stems are formed on said filter holders; and said post is formed with holes through which said stems extend to secure said holders to said post.

8. Spray painting equipment as in claim 6 in which said stems are threaded; and bolts are threaded on said stems on opposite sides of said post.

9. Spray painting equipment as in claim 1 in which said tank support comprises two spaced tines dimensioned to engaged said gravity feed paint tank.

10. Spray painting equipment as in claim 8 in which said gravity feed paint tank has an open upper end; and a relatively narrower lower end engageable between said spaced tines.

* * * * *